May 2, 1933.

D. R. DE TAR.

INSTRUMENT CONTROL ELEMENT

Re. 18,815

Original Filed Aug. 20, 1929

Inventor:
Donald R. De Tar,
by Charles E. Mullen
His Attorney.

Reissued May 2, 1933 Re. 18,815

UNITED STATES PATENT OFFICE

DONALD R. DE TAR, OF COLLINGSWOOD, NEW JERSEY, ASSIGNOR TO GENERAL ELECTRIC COMPANY, A CORPORATION OF NEW YORK

INSTRUMENT CONTROL ELEMENT

Original No. 1,800,055, dated April 7, 1931, Serial No. 387,182, filed August 20, 1929. Application for reissue filed September 29, 1932. Serial No. 635,465.

The present invention relates to instrument control elements, such as are commonly known in connection with radio apparatus and instruments as panel knobs, or which form a constituent part of the latter, these panel knobs being adapted to provide control handles for instrument control shafts and the like whereby the latter may be manually operated. A control element of this character is usually of insulating material and is provided with a flange having a serrated exterior annular surface and with a hub, integral with the flange, this hub being adapted to receive a shaft end, and having a metal insert and set screw for engaging said shaft end.

A set screw as used in an instrument knob requires a hole for a screw-driver in one side of the knob. The hole is objectionable as it detracts from the finished appearance of the knob. The metal insert and the set screw are costly also, not only in manufacture but in the matter of time required for assembling. Furthermore, the set screw often strips its threads or breaks in assembling or loosens in operation thereby permitting the knob with which it is used to wabble or run out of true. Various expedients have been proposed to eliminate the use of set screws as holding means for knobs and other instrument control elements but such means have not had extensive use because of cost of manufacture and size.

It is the object of this present invention to provide an improved instrument knob or control element which may be manufactured economically, which may be assembled quickly and easily and mounted upon or removed from a shaft without the use of tools, and which when mounted is rigidly held upon a shaft without side play or wabble.

The invention will be better understood from the following description considered in connection with the accompanying drawing, and its scope will be pointed out in the appended claims.

Figure 1:
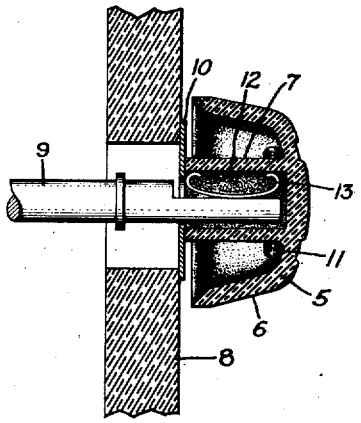
Figure 1:
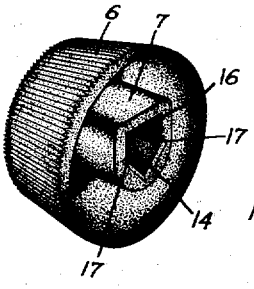
Figure 2:
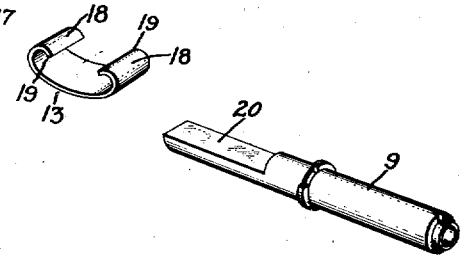
Figure 3:
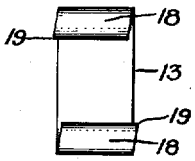

In the drawing, Fig. 1 is a side view, partly in section, of an instrument knob embodying the invention and mounted as a panel knob on an instrument control shaft; Fig. 2 is a view in perspective of the knob and the shaft of Fig. 1 before assembling, showing further details of construction; and Fig. 3 is a detail view of a holding means for the knob showing a constructional feature thereof.

Referring to the drawing, 5 is a body portion of the knob which may be of any suitable size and shape and which represents any suitable instrument control element. In the present example it is annular in form and cup-shaped in section to provide an annular flange 6 which surrounds a central hub 7. The flange is externally serrated or grooved in an axial direction as indicated, whereby it may readily be grasped and turned. The hub is of slightly greater axial length than the flange whereby the knob or its flange is caused to rotate in spaced relation from the instrument panel 8, when mounted on a control shaft 9 which projects through the panel as indicated in the drawing. Additional spacing may be provided by a washer 10 placed upon the shaft between the panel and the hub.

The body portion of the knob, including the flange and the hub, are preferably made integral as shown, and as a preferred construction they are made of molded material such as insulating material, provided with suitable reinforcing webs between the hub and the body as indicated at 11.

The hub in the knob of the present example is provided with a central, axially extending cavity 12 which may be formed in the hub when the knob is molded. In control elements of other forms, the cavity may be located in any suitable portion thereof. The cavity is adapted to receive the shaft end and a simple holding means or retainer spring 13 as shown in Fig. 1. The cavity is formed for this purpose by a V-shaped, axially extending groove 14 which is diametrically opposite and jointed with a rectangular, axially-extending slot 16. In the side walls of the cavity between the adjoining slot and groove, and marking their junction, are two parallel shoulders or ledges 17 extending axially of the cavity on opposite sides thereof.

The retaining spring is a simple flat piece bowed or made slightly concavo-convex by bending in the middle portion and having curled ends 18 which are slightly deformed laterally as indicated in Fig. 3, to provide projecting corners or retaining means 19 at the ends and on opposite edges.

The width of the slot is only slightly greater than the width of the retainer spring between its lateral edges whereby the retainer spring is freely slidable in the slot with the shoulders 17 as guides and as positioning means. The slot is of such depth from the shoulders 17 that the retainer spring tends to be slightly flattened when pressed into the slot. The retainer spring is however secured in the slot by the projecting corners or retaining means 19 at the curled ends. The corners cut into the walls of the cavity as the retainer spring is pressed to a seating position in the cavity substantially as shown in Fig. 1.

The convex surface of the retainer spring is presented toward the groove 14 in a position to provide a cover for the groove and to engage a flattened end portion 20 of the instrument shaft 9 when the knob is pressed upon the shaft. The spring is further flattened when the knob is located upon the shaft serves to press the knob in a direction to cause the walls of the groove 14 to engage the round portion of the shaft adjacent the flat portion 20. The spring is so tensioned that it retains the knob firmly on the shaft, the latter being gripped between the spring and the walls of the V-shaped groove. With this arrangement it has been found that the knob is held rigidly upon the shaft without side play or wabble, while at the same time the knob is easily removable from or replaceable upon the shaft.

In brief, the knob or handle may be of any suitable form having a cavity, two sides of which cavity are arranged to intersect and provide a V-shaped groove into which the round portion of a flattened shaft end is forced by a curled spring pressing upon the flat portion of the shaft. The spring is formed of flat material slightly narrower than the cavity into which it fits along with the shaft, and the curled ends of the spring are slightly twisted or deformed laterally to provide projecting corners which are forced into the side walls of the cavity to prevent the spring from falling out or from being withdrawn with the shaft. The corners thus provide retaining means integral with and at the ends of the spring for automatically engaging the walls of the cavity when the spring is pressed to a seated position in the cavity.

It will be readily apparent that the curled ends of the spring 13 prevent the bowed portion thereof from being depressed to such a degree that the spring is permanently deformed whenever the shaft 9 is turned until it reaches the limit of its travel and the control handle is then twisted with considerable force by the operator. Therefore the curled ends of the spring 13 and those faces of the groove 14 against which these curled ends press when the shaft 9 is in its operative position within the cavity 12 constitute stop means associated with the spring and groove to prevent permanent deformation of the spring by the flattened end portion of the shaft.

The advantages of this arrangement over the usual knob or handle construction involving set screws and other holding means molded into the knob are as follows:

1. The cost is less as the spring retainer means is cheaper to manufacture and to assemble with the knob than is a metal insert and a set screw.

2. The knob is made readily removable for servicing the apparatus with which the knob is used. Furthermore the knob may be quickly mounted upon a shaft with which it is to be used.

3. Breakage of hardened set screws is eliminated.

4. Assembly of the knob is very much simplified since it is merely necessary to press the spring retainer into the cavity and push the knob upon the end of the shaft with which it is to be used.

5. The knob is held in place more firmly than with a set screw construction and there is nothing to loosen during operation and permit the knob to wabble or become inoperative.

6. The exterior appearance of the knob is not marred by any hole or other opening for the insertion of a screwdriver as is the case with knobs provided with set screws.

In the preferred embodiment of my invention hereinbefore described the cavity 12 is set forth as molded directly in a portion, as hub 7, of a control handle or element formed integrally of molded material. It will be readily apparent, however, that in certain instances, for example in case the main body of the complete control handle or element is formed of a non-molded material such as wood, it may be desirable to form the cavity 12 in a separate member, preferably a molded metal insert, which in the assembling of the complete control handle or element may be pressed into a suitable opening in the body of wood or similar material. It is to be understood, therefore, that the expression "control element" as employed in the appended claims is intended to include within its scope such insert or separate control member, which may become a constituent part of a complete control handle or element such as shown and described herein.

What I claim as new and desire to secure by Letters Patent of the United States, is:

1. An instrument control element provided with a cavity for receiving a shaft end, and a shaft retaining means arranged to lie in said cavity and including a flat spring having a bowed central portion for engaging a shaft end and having curled ends deformed laterally to present corners which engage the walls of the cavity to retain said spring therein.

2. An instrument control element provided with a cavity for receiving a shaft end, said cavity having two walls intersecting to form a V-shaped groove, a shaft retaining means in said cavity, said means including a flat spring presenting a bowed portion as a cover for said groove and having curled ends, said ends being deformed laterally to present corners which engage the walls of the cavity and retain said spring therein, and means in said cavity arranged to guide said spring to a seated position therein.

3. The combination with an instrument control shaft having a flattened end portion, of a panel knob therefor including a body, a hub integral with the body and provided with a cavity for receiving said end portion of the shaft, said cavity including a groove in which the shaft end lies in a seated position, means for maintaining said shaft in said position including a spring having a bowed center portion engaging the flattened portion of the shaft, a rectangular slot forming part of said cavity and adapted to receive the spring, and means integral with and carried by the spring engaging the walls of the slot and permanently securing said spring in the cavity.

4. The combination with an instrument control shaft having a flattened end portion, of a panel knob therefor including a body, a hub integral with the body and provided with a cavity for receiving the end portion of the shaft, said cavity including a groove in which the shaft lies in a seated position, means for maintaining said shaft in said position including a spring having a bowed center portion engaging said flattened end portion of the shaft, a slot forming part of said cavity and adapted to receive the spring, means integral with and carried by the spring arranged to engage the walls of the slot and permanently secure said spring in the cavity, and a pair of oppositely disposed shoulders in the cavity adapted to guide and position the spring.

5. In combination, a body having a cavity for receiving a shaft end, said cavity having two walls intersecting to form a V-shaped groove, a bowed spring in said cavity for forcing a shaft end into said groove, said spring being of flat material and having curled ends, means for positioning the spring in said cavity to engage adjacent its central portion a portion of said shaft when seated in the groove, and means carried by the spring at its ends adapted automatically to engage the walls of the cavity and hold said spring permanently in place when pressed to a seated position in the cavity.

6. The combination with an instrument control handle, of means carried thereby for releasably engaging a flattened instrument control shaft, said means including a hub provided with a cavity formed by a V-shaped groove and a rectangular slot arranged in oppositely disposed relation to each other, the walls of said cavity being provided with a pair of parallel, oppositely-disposed shoulders between the rectangular slot and the groove, a bowed spring member having curled ends seated in said slot with its convex portion adjacent the groove, said spring having curled end portions deformed laterally to provide means which engage the walls of said cavity.

7. An instrument knob adapted to releasably engage the flattened end of a shaft, said knob including a body portion, a V-shaped groove in said body portion, a bowed spring of flat material extending along and forming a cover for said groove, and means for retaining said spring in said relation to said groove, said means including a rectangular slot in which the spring is seated, means in the walls of the slot providing shoulders for guiding said spring, and means integral with the ends of the spring adapted to force an engagement with the walls of the slot.

8. An instrument control element provided with a cavity for receiving a shaft end, said cavity having two walls intersecting to form a V-shaped groove, a shaft retaining means in said cavity, said means including a flat spring presenting a bowed portion as a cover for said groove and having curled ends, said ends being deformed laterally to present corners engaging the walls of the cavity and retaining said spring therein.

9. An instrument control element provided with a cavity for receiving a shaft end, a shaft retaining means arranged to lie in said cavity and including a flat spring having a bowed central portion for engaging a shaft, and two parallel shoulders extending axially of said cavity and on opposite sides thereof engaging said bowed portion of said spring to retain said spring within said cavity when said shaft is withdrawn therefrom.

10. An instrument control element provided with a cavity for receiving a shaft having a flattened end portion, said cavity having two walls intersecting to form a V-shaped groove, a shaft retaining means in said cavity, said means including a flat spring presenting a bowed portion as a cover for said groove, said bowed portion engaging said flattened end portion of the shaft to maintain the shaft in seated position in said groove, and means in said cavity including a rectangular slot formed therein opposite said V-shaped groove to guide said spring to a seated position therein.

11. The combination with an instrument control shaft having a flattened end portion, of a control element for said shaft provided with a cavity for receiving said end portion of the shaft, said cavity including a groove in which the shaft end lies in a seated position, means for maintaining said shaft in said position including a spring having a bowed center portion engaging the flattened portion of the shaft, a rectangular slot forming part of said cavity and adapted to receive the spring, and means including a pair of oppositely disposed shoulders formed within said cavity and extending axially thereof to guide said spring to a seated position within said slot.

12. The combination with an instrument control shaft having a flattened end portion, of a control element for said shaft provided with a cavity for receiving the end portion of the shaft, said cavity including a groove in which the shaft lies in a seated position, means for maintaining said shaft in said position including a spring having a bowed center portion engaging said flattened end portion of the shaft, a slot forming part of said cavity and adapted to receive the spring, and a pair of oppositely disposed shoulders in the cavity adapted to guide and position the spring.

13. In combination, a body having a cavity for receiving a shaft having a flattened end portion, said cavity having two walls intersecting to form a V-shaped groove, a spring in said cavity, said spring having a bowed portion engaging said flattened shaft end portion of the shaft for forcing said shaft end into said groove and for maintaining the shaft end in seated position in the groove, said spring being of flat material, and means for positioning the spring in said cavity, said means including a rectangular groove to receive said spring and two shoulders oppositely disposed within said cavity and extending axially thereof to guide said spring to a seated position in said rectangular groove.

14. The combination with an instrument control handle, of means carried thereby for releasably engaging a flattened instrument control shaft, said means including a body provided with a cavity formed by a V-shaped groove and a rectangular slot arranged in oppositely disposed relation to each other, and a bowed spring member seated in said slot with its convex portion adjacent the groove, the walls of said cavity being provided with a pair of parallel, oppositely-disposed shoulders between the rectangular slot and the groove, said spring being compressed between said shoulders and a wall of said groove when said shaft is withdrawn from within said cavity.

15. An instrument control element adapted to releasably engage the flattened end of a shaft, a V-shaped groove in said control element, a spring of flat material extending along and forming a cover for said groove, said spring having a bowed portion engaging said flattened end of the shaft to maintain the shaft in seated position in said groove, and means for retaining said spring in said relation to said groove, said means including a rectangular slot in which the spring is seated, means in the walls of the slot providing shoulders for guiding said spring, and means integral with the spring adapted to enforce an engagement with the walls of the slot.

16. The combination with an instrument control shaft having a flattened end portion, of a control element for said shaft provided with a cavity for receiving said end portion of the shaft, said cavity including a groove in which the shaft end lies in a seated position, means for maintaining said shaft in said position including a spring having a bowed center portion engaging the flattened portion of the shaft, a rectangular slot forming part of said cavity and adapted to receive the spring, means including a pair of oppositely disposed shoulders formed within said cavity and extending axially thereof to guide said spring to a seated position within said slot, and stop means associated with said spring and said groove to limit deformation of the spring by said flattened end of the shaft.

17. The combination with an instrument control shaft having a flattened end portion, of a control element for said shaft provided with a cavity for receiving the end portion of the shaft, said cavity including a groove in which the shaft lies in a seated position, means for maintaining said shaft in said position including a spring having a bowed center portion engaging said flattened end portion of the shaft, a slot forming part of said cavity and adapted to receive the spring, a pair of oppositely disposed shoulders in the cavity adapted to guide and position the spring, and stop means associated with said spring and said groove to limit deformation of the spring by said flattened end portion of the shaft.

18. An instrument control element adapted to releasably engage the flattened end of a shaft, a V-shaped groove in said control element, a bowed spring of flat material extending along and forming a cover for said groove, means for retaining said spring in said groove, said means including a rectangular slot in which the spring is seated, means in the walls of the slot providing shoulders for guiding said spring, and stop means associated with said spring and said groove to limit deformation of the spring by said flattened end of the shaft.

19. An instrument control element provided with a cavity for receiving a shaft end, and a shaft retaining means arranged to lie in said cavity and including a flat spring having a bowed central portion for engaging the shaft end to maintain the shaft in seated position in the cavity, at least one end of said spring being shaped to present an edge tending to engage and penetrate a wall of said cavity to assist in retaining said spring therein.

20. An instrument control element provided with a cavity for receiving a shaft having a flattened end portion, and a shaft retaining means arranged to lie in said cavity and including a flat spring having a bowed central portion for engaging said flattened end portion of the shaft to maintain the shaft in seated position in the cavity, at least one end of said spring being shaped to present an edge tending to engage and penetrate a wall of said cavity to assist in retaining said spring therein.

21. An instrument control element provided with a cavity for receiving a shaft end, and a shaft retaining means arranged to lie in said cavity and including a spring having a bowed portion for engaging the shaft end to maintain the shaft in seated position in the cavity, at least one end of said spring being so shaped that it tends to penetrate a wall of said cavity to assist in retaining the spring therein.

22. An instrument control element provided with a cavity for receiving a shaft having a flattened end portion, and a shaft retaining means arranged to lie in said cavity and including a flat spring having a bowed central portion for engaging said flattened end portion of the shaft to maintain the shaft in seated position in the cavity, at least one end of said spring being so shaped that it tends to penetrate a wall of said cavity to assist in retaining the spring therein.

In witness whereof, I have hereto set my hand.

DONALD R. DE TAR.